Nov. 30, 1943.  M. KOPPELMAN  2,335,340
VEHICLE SAFETY SEAT
Filed Sept. 8, 1941  2 Sheets-Sheet 1

INVENTOR.
Morris Koppelman
BY
C. Lawyn Maltby
ATTORNEY.

Nov. 30, 1943.    M. KOPPELMAN    2,335,340
VEHICLE SAFETY SEAT
Filed Sept. 8, 1941    2 Sheets-Sheet 2
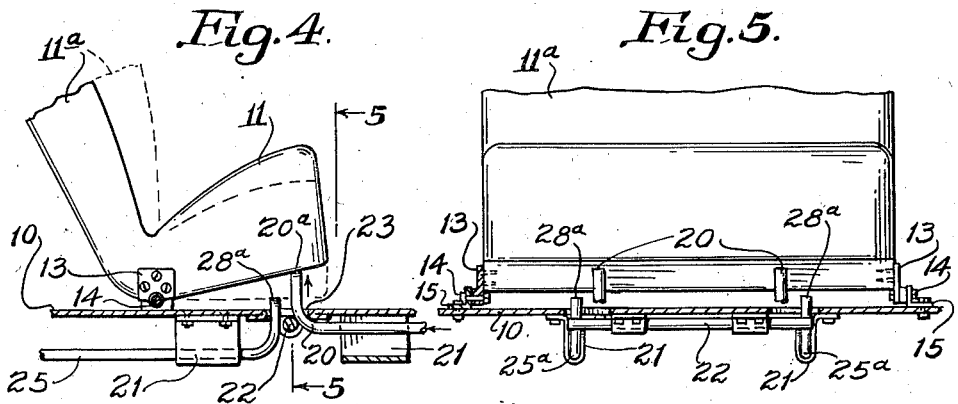
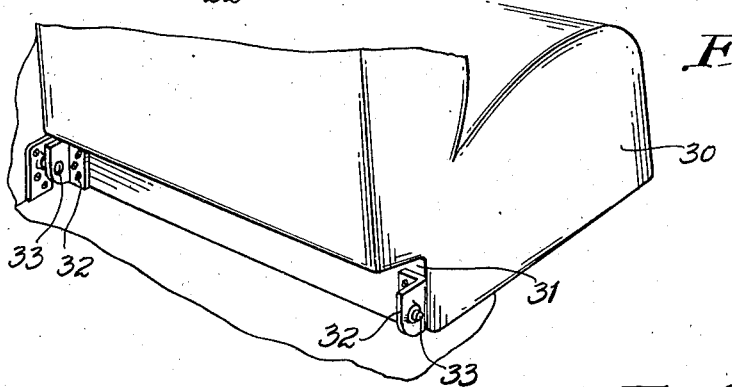
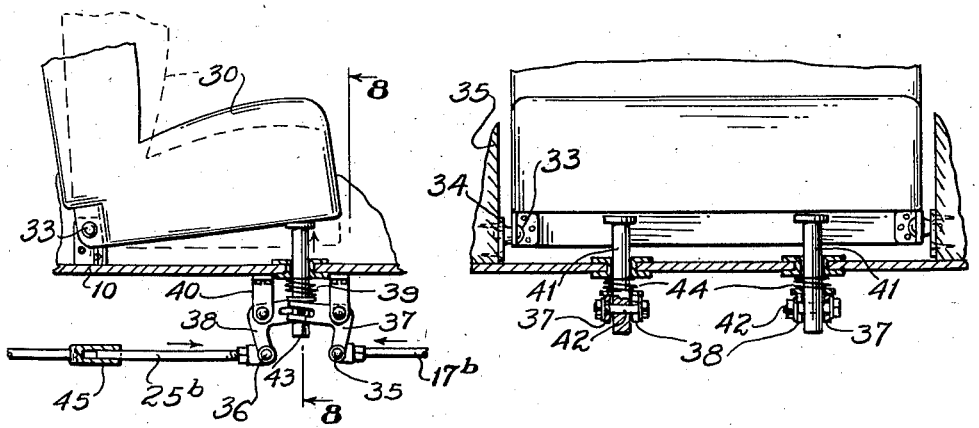
INVENTOR.
*Morris Koppelman*
BY
*C. Lauren Maltby*
ATTORNEY Patented Nov. 30, 1943

2,335,340

UNITED STATES PATENT OFFICE 2,335,340

VEHICLE SAFETY SEAT

Morris Koppelman, Sierra Madre, Calif.

Application September 8, 1941, Serial No. 409,990

6 Claims. (Cl. 155—9)

This invention relates to motor vehicles and the like and more especially to a safety seat construction for the same.

An object of the invention is to provide a simple, practical and inexpensive safety seat construction of the character described.

Another object of the invention is to provide a safety seat construction for vehicles adapted to prevent injury to the occupants thereof upon the impact of the vehicle with another vehicle or another object.

An additional object is to provide a safety seat structure for vehicles which will absorb and reduce the impact of a collision on one or both cars involved.

A further object is to provide a safety seat construction which will reduce the impact of either a front end or rear end engagement.

Another object is to provide a safety seat construction applicable to all the seats of a vehicle and adapted to be applied to vehicles before as well as after construction thereof.

Other objects and advantages will appear and be brought out more fully in the following, specific reference being had to the accompanying drawings wherein:

Fig. 4 is a fragmentary view showing the seat in actuated position.

Fig. 5 is a sectional view taken along the line 5—5 of Fig. 4.

Fig. 6 is a perspective view partly broken away showing a modified form of seat pivoting means.

Fig. 7 is a side elevation view showing a modified form of seat tilting means.

Fig. 8 is a sectional view taken along line 8—8 of Fig. 7.

Figure 1:
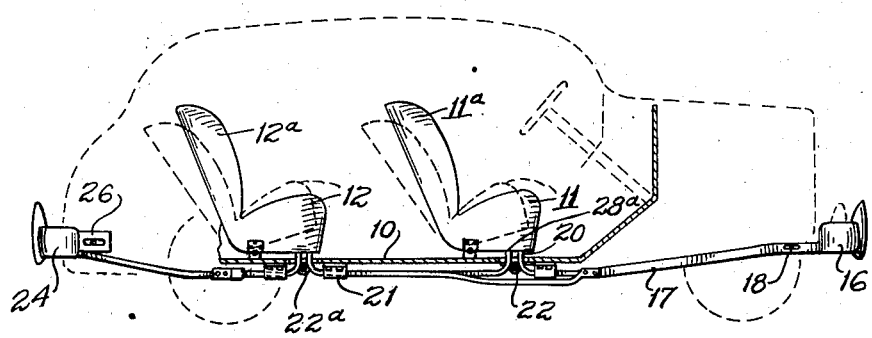
Fig. 1 is a side elevation of a form of the invention as applied to a motor vehicle.
Figure 2:
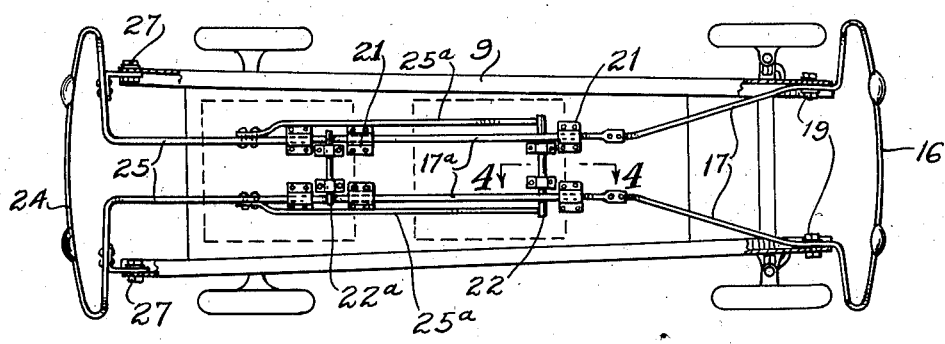
Fig. 2 is a bottom view of the same.
Figure 3:
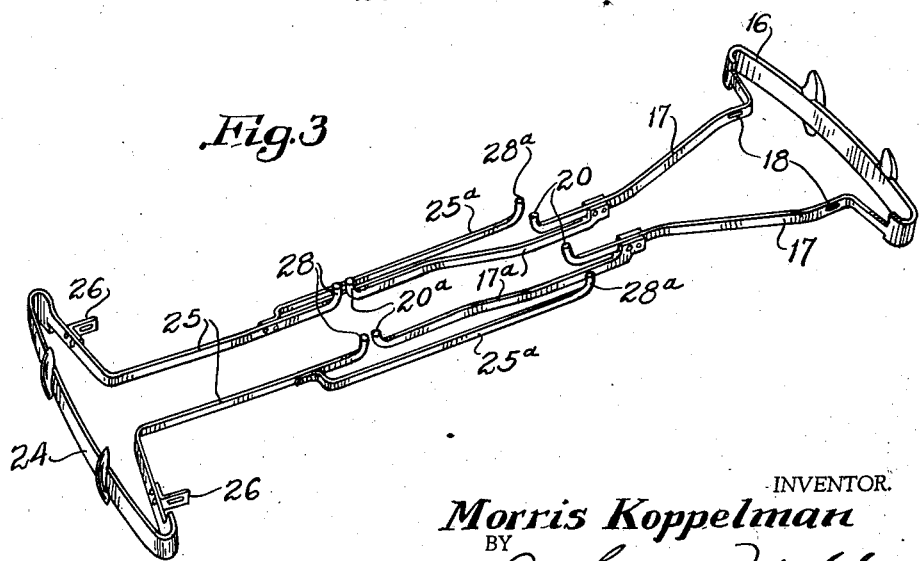
Fig. 3 is a perspective view of the same.

Referring more particularly to the drawings and especially to Figs. 1 to 5 I show in outline a motor vehicle having a frame 9, floor 10, a driver's seat 11 having a back portion 11a and a rear seat having a back portion 12a. Seats 11 and 12 are each provided with a pair of brackets 13 each having a pivot pin 14 for engagement with a floor bracket 15.

I show a front bumper 16 having a pair of rearwardly extending portions 17 provided with slots 18 for slidable movement on pins 19 secured to frame 9. Members 17 have curved end portions 20 and a guide bearing 21 is suitably secured to floor 10 or to frame 9 for rod portions 17. A bearing bar 22 is suitably secured to floor 10 and adjacent curved portions 20 of rods 17, floor 10 being provided with suitable apertures 23 to admit the upwardly curved end portion 20 of rods 17. Rod portions 17a having upwardly curved end portions 20a are secured to rods 17, the end portions 20a being similarly positioned under rear seat 12.

I show a rear bumper 24 having forwardly extending rod portions 25 slidably secured as by slotted brackets 26 to frame 9 by pins 27 and having upwardly curved end portions 28 under rear seat 12 and adjacent a bearing bar 22a. A rod extension 25a is secured to each rod 25 and has an upwardly curved end portion 28a adjacent bearing bar 22 under seat 12.

By the construction as described it will be apparent that when front bumper 16 is pushed rearwardly upon impact of the vehicle with another vehicle or object, curved end portions 20 and 20a are raised by rods 22 and 22a and tilt seats 11 and 12 upwardly and backwardly as indicated by the dotted lines in Fig. 1 and in full lines in Figs. 4 and 5. In this backwardly tilting position the occupants of the seats will not be thrown forwardly and off the seats as otherwise occurs in vehicles having fixed seat structures, when an impact occurs.

In Figs. 6 to 8 I show a modified form of seat pivoting and tilting means. In these figures I show a seat 30 having a cut-out portion 31 at the rear lower edge and a pair of brackets 32 secured thereto and having pivoting pins 33 for brackets 34 secured to side wall portions 35 of the vehicle body structure. I show rod sections 17b and 25b essentially similar rods 17 and 25 pivotally secured at 35 and 36 respectively each to a bell crank 37 and 38 having pivot bearing brackets 39 and 40 suitably secured under floor 10. A pair of plungers 41 are positioned below and support the forward portion of seat 30, each plunger 41 being provided with a pin 42 for engagement in a slot 43 in bell cranks 37 and 38. A spring 44 may be provided on each plunger 41 if desired, facilitating the return movement of rods 17b and 25b after actuation. I show a lost motion link 45 which may be important in rods 17b and 25b.

It will be clear that my invention as shown and described hereinabove is applicable to any type of vehicle having seats, such as passenger automobiles, buses, commercial trucks, army trucks and cars and airplanes, the essential features being the tilting of the seat upwardly and backwardly to prevent the occupant from being thrown off forwardly upon the impact of the vehicle with another vehicle or object. By this invention the vehicle operation will be much safer since the injury to the passengers will be greatly reduced or even prevented. It will also be clear that the tilting of the seats will occur upon the impact from the rear as well as from the front and also the bumper actuated elements will operate upon a diagonal impact at a considerable angle.

While I have shown and described preferred forms of the invention, changes and modifications may be made without departing from the spirit and scope of the subjoined claims.

Having described my invention what I claim is:

1. In a vehicle as described, a seat pivotally mounted at a rear portion thereof and means to raise the front portion thereof upon the impact of said vehicle with another object, said means including a rod extending beyond an end of said vehicle and having an operating member thereat.

2. In a vehicle as described, a seat pivotally mounted at a rear portion thereof and means to raise the front portion thereof upon the impact of said vehicle with another object, said means including a rod extending beyond an end of said vehicle and having an operating member thereat, said last means adapted to engage said seat.

3. In a vehicle as described, a seat pivotally mounted at a rear portion thereof and means to raise the front portion thereof upon the impact of said vehicle with another object, said means including a rod extending beyond an end of said vehicle and having an operating member thereat, said rod having an upwardly turned end adapted to engage said seat upon impact of the operating member with another object.

4. In a vehicle as described, a seat pivotally mounted at a rear portion thereof and means to raise the front portion thereof upon the impact of said vehicle with another object, said means including a rod extending beyond an end of said vehicle and having an operating member thereat, link means adapted to engage said seat, a bell crank connected to said link and rod.

5. In a vehicle as described, a seat pivotally mounted therein substantially at the lower rear edge portion thereof, a bumper element adapted to be shifted upon the impact of said vehicle with another object and means adapted to be actuated by the shifting of said bumper element to raise the forward edge portion of said seat.

6. In a vehicle as described a seat adapted to be tilted upwardly and backwardly, a curved bumper element adapted to be shifted upon a diagonal impact of said vehicle with an object and mechanism operatively engageable with said seat to tilt said seat, said mechanism being adapted to be actuated by the shifting of said bumper element.

MORRIS KOPPELMAN.